(12) United States Patent
Kroczek et al.

(10) Patent No.: US 12,441,536 B2
(45) Date of Patent: Oct. 14, 2025

(54) WATER PORT CLOSURE ASSEMBLY

(71) Applicant: B/E AEROSPACE, INC., Winston Salem, NC (US)

(72) Inventors: Piotr Jacek Kroczek, Nieciszów (PL); Dariusz Celestyn Sapija, Kiełczówek (PL)

(73) Assignee: B/E Aerospace, Inc., Winston Salem, NC (US)

( * ) Notice: Subject to any disclaimer, the term of this patent is extended or adjusted under 35 U.S.C. 154(b) by 2 days.

(21) Appl. No.: 18/418,485

(22) Filed: Jan. 22, 2024

(65) Prior Publication Data

US 2024/0253894 A1     Aug. 1, 2024

(30) Foreign Application Priority Data

Jan. 26, 2023 (EP) ..................................... 23461506

(51) Int. Cl.
| | | |
|---|---|---|
| *B65D 88/54* | (2006.01) | |
| *E03B 11/02* | (2006.01) | |
| *F16J 13/18* | (2006.01) | |
| *F16L 55/115* | (2006.01) | |

(52) U.S. Cl.
CPC .............. *B65D 88/54* (2013.01); *E03B 11/02* (2013.01); *F16J 13/18* (2013.01); *F16L 55/1157* (2013.01)

(58) Field of Classification Search
CPC . B65D 88/54; E03B 11/02; F16J 13/18; F16L 55/1157; F16K 27/12
USPC .......................................... 137/800; 251/297
See application file for complete search history.

(56) References Cited

U.S. PATENT DOCUMENTS

| | | | |
|---|---|---|---|
| 4,098,427 A | | 7/1978 | Duckworth, Jr. |
| 4,127,215 A | * | 11/1978 | Morrison .............. B64C 1/1407 220/259.3 |
| 5,246,131 A | | 9/1993 | Shaw et al. |
| 5,535,784 A | * | 7/1996 | Saville .................... F16K 1/205 251/147 |
| 5,582,521 A | * | 12/1996 | Mori .................... H01R 13/447 439/142 |

(Continued)

FOREIGN PATENT DOCUMENTS

| | | |
|---|---|---|
| EP | 3282204 | 5/2020 |
| KR | 20150028211 | 3/2015 |

OTHER PUBLICATIONS

European Patent Office; European Search Report filed Jun. 29, 2023 in Application No. 23461506.0.

*Primary Examiner* — John Bastianelli
(74) *Attorney, Agent, or Firm* — SNELL & WILMER L.L.P.

(57) ABSTRACT

A fill port assembly comprising: a housing having an opening therethrough; a fill port located in and extending through the opening defining a flow passage through the fill port from a first end to a second end, the flow passage having an axis defined between the first end and the second end; and a closure mechanism moveable between an open position in which the flow channel is open and allows fluid flow therethrough and a closed position in which the flow channel is closed and prevents fluid flow therethrough, wherein the closure mechanism comprises: a cap attached at a first side of the cap to a first side of the housing via a hinge, the cap pivotable about the hinge between an open position with respect to the fill port and a closed position to close the second end of the fill port.

13 Claims, 11 Drawing Sheets

(56) References Cited

U.S. PATENT DOCUMENTS

| | | | |
|---|---|---|---|
| 7,458,482 B2 * | 12/2008 | Yasuda | ................... H02B 1/50 220/255 |
| 9,431,778 B1 | 8/2016 | Mueller et al. | |
| 2005/0166983 A1 | 8/2005 | Shaw et al. | |
| 2021/0053731 A1 | 2/2021 | Lane | |

* cited by examiner

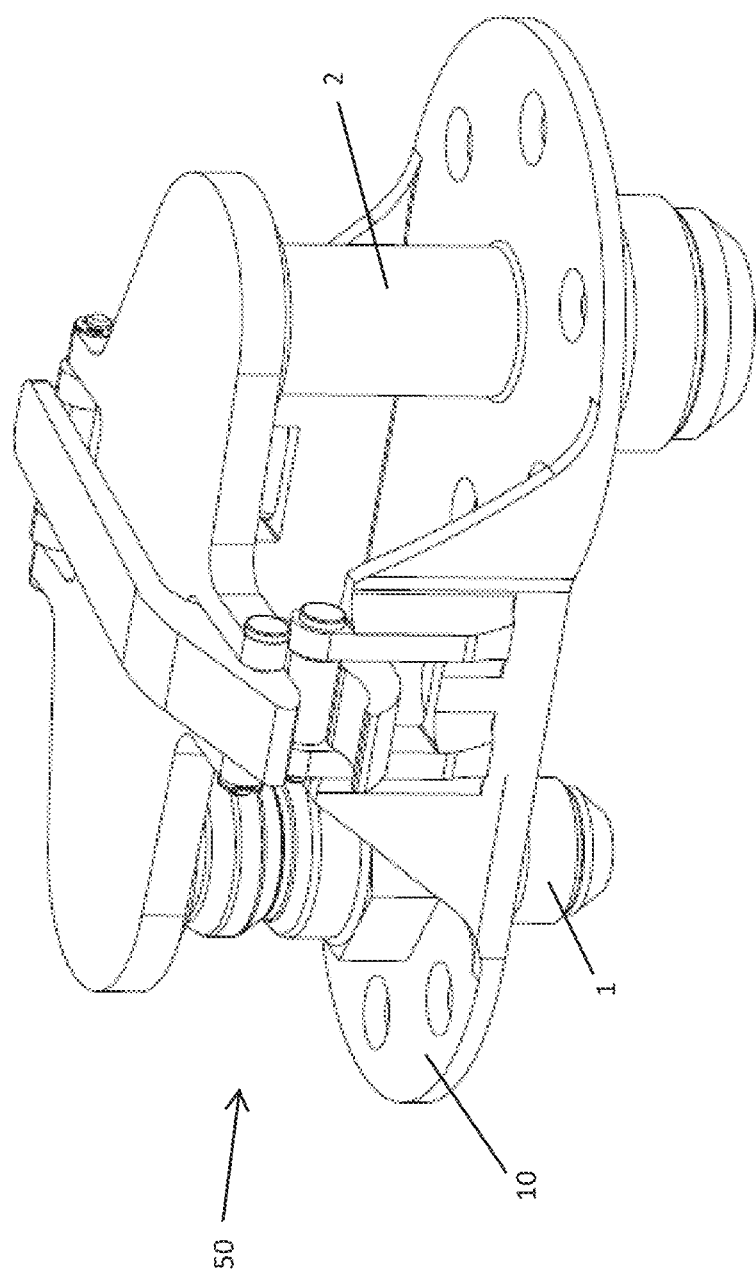

WATER PORT CLOSURE ASSEMBLY

CROSS-REFERENCE TO RELATED APPLICATIONS

This application claims priority to, and the benefit of, EP Patent Application No. 23461506.0, filed Jan. 26, 2023 and titled "WATER PORT CLOSURE ASSEMBLY," which is incorporated by reference herein in its entirety for all purposes.

FIELD

The present disclosure is concerned with providing a closure assembly for ports in a water system, such as the fill and overflow ports of a water system. The water system can, for example, be a system for providing potable or fresh water in an aircraft.

BACKGROUND

Water systems often include a tank or storage vessel to store water which can then be plumbed to other parts of the system to provide water to different parts of the system from the storage tank/vessel. The tank will need to be periodically re-filled. Typically, the tank is provided with a fill port to which a fill line, connected to a source of water, is connected for re-filling the tank from the source. The tank may also be provided with an overflow or overfill line via which water can exit the tank if the tank is overfilled. The overflow water exits from an overflow port on the tank. During the tank filling process, the fill port, and, where present, the overflow port, will be open. In some applications, the ports are left open after filling. The ports may be provided in an operating panel that is covered by a door or panel when not in use. In certain environments, e.g. where the tank is subjected to movement or vibration or in environments where debris or contaminants exits which should not be allowed to get into the tank, a closure or cap assembly is provided at the ports to close the port(s) when not being filled. In an arrangement with a fill port and an overflow port, each port may be provided with its own cap or closure or, alternatively, a single closure can be provided that covers both ports, when closed. Such assemblies may be used, for example, in aircraft. An aircraft typically has water stations in the cabin for dispensing drinking water during flight. The aircraft has a storage tank filled with potable water and plumbing to provide water from the tank to the stations as required. The tank is re-filled between flights by ground crew, by connecting an external source of water, e.g. a water truck, to the tank via a hose connected to the fill line attached to the fill port.

Whilst existing closure arrangements are effective in closing the ports, they are typically hinged relative to the ports in such a way that they require a large area around the ports to allow them to open and close. Typically, an arm or lever is attached to the caps and is moved in a large arc to open the caps. In environments where space is limited e.g. in aircraft, this is undesirable and there is a need for an improved port closure assembly that provides effective closure but also allows the closure to be opened and closed within a limited space. In addition, repeated opening and closing of the closure components about a hinge causes wear and means that the parts need to be replaced long before their life would otherwise expire.

SUMMARY

According to the disclosure, there is provided a fill port assembly comprising: a housing having an opening therethrough; a fill port located in and extending through the opening defining a flow passage through the fill port from a first end to a second end, the flow passage having an axis defined between the first end and the second end; and a closure mechanism moveable between an open position in which the flow channel is open and allows fluid flow therethrough and a closed position in which the flow channel is closed and prevents fluid flow therethrough, wherein the closure mechanism comprises: a cap attached at a first side of the cap to a first side of the housing via a hinge, the cap pivotable about the hinge between an open position with respect to the fill port and a closed position to close the second end of the fill port, and a catch assembly provided between a second side of the cap, opposite the first side, and a second side of the housing, opposite the first side, to releasably secure the cap in the closed position, wherein the catch assembly comprises a spring latch part secured in a channel at the second side of the housing, the spring latch part having first and second end pins and a spring between the first and second end pins, the spring biased to extend the first and second end pins beyond the respective ends of the channel, the catch assembly further comprising opposing first and second catch arms extending from the second side of the cap arranged to cooperate respectively with the first and second ends of the spring latch part as the cap is pivoted about the hinge to the closed position, the first and second catch arms each having a respective inwardly facing recess in which the respective ends of the spring latch part are received when the cap is moved to the closed position.

Also provided is a port assembly comprising a fluid port having a fluid flow channel defined along an axis and fluid opening at an end of the fluid flow channel, and a closure assembly as defined above.

BRIEF DESCRIPTION OF THE DRAWINGS

Examples of the assembly according to this disclosure will be described by way of example only and with reference to the drawings. It should be noted that variations are possible within the scope of the claims.

FIGS. 6A and 6B show, respectively, 3D views of a known assembly and an assembly according to the disclosure, for comparison.

DETAILED DESCRIPTION

Figure 1:
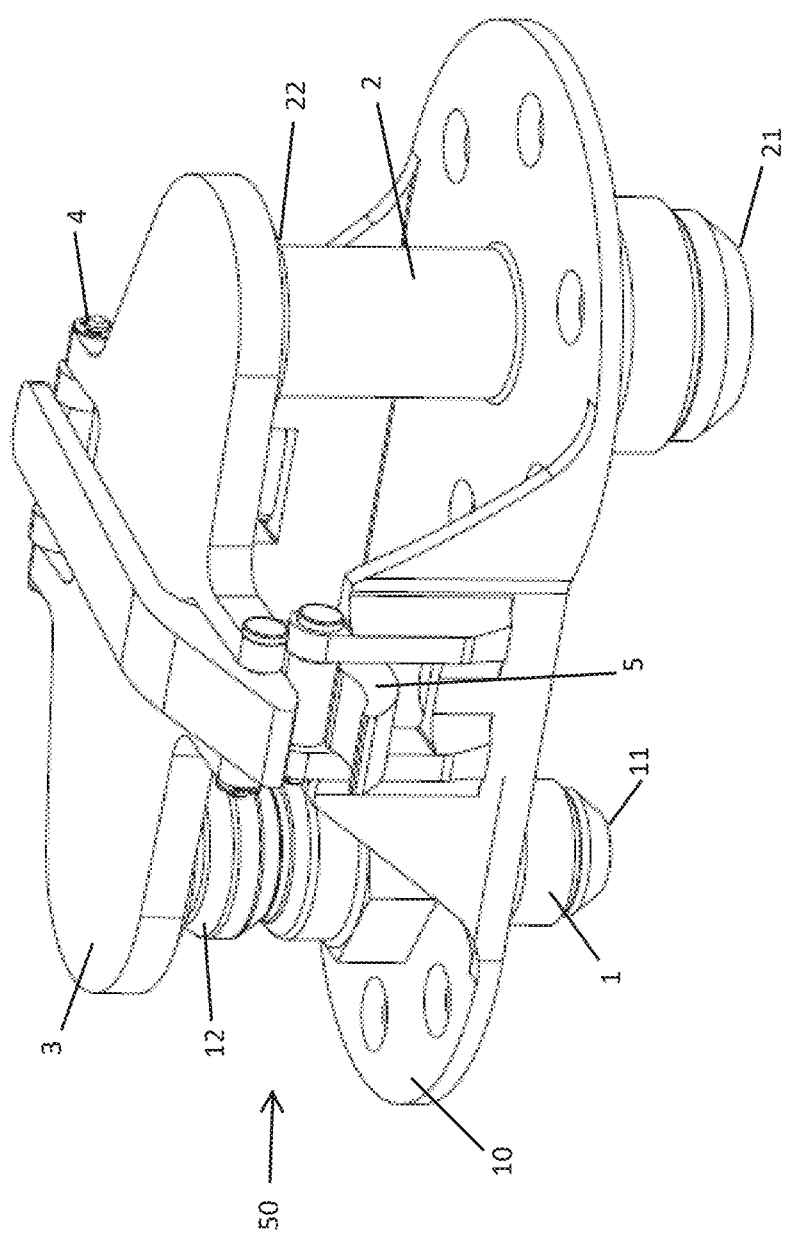
FIG. 1 is a perspective view of an example of a known closure assembly for a fill port and an overflow port of a water system.

By way of background, an example of a known port closure assembly 50 will first be described, with reference to FIGS. 1, 2A and 2B.

In this assembly, a fill port 1 and an overflow port 2 are provided in a housing 10. These will be in fluid connection at a first end 11, 21 with the storage tank or other vessel to be filled via the fill port. The second end 12 of the fill port 1 is provided with a respective fitting 31 configured to be fluidly connected to a fill line (not shown) when the tank is being filled. The second end 22 of the overflow port 2 is provided with a fitting configured to be fluidly connected to an overflow line (not shown). A cap 3 is provided to cover the second ends 12, 22 of the fill and overflow ports in the closed state. In the example shown, a single cap is provided that covers both ports 1, 2 as this simplifies the closing operation by the user and reduces the risk of a port being inadvertently left open after filling. Other known assemblies have a separate cap for each port.

The cap 3 is mounted to the assembly housing 10 by a hinge arrangement 4 adjacent the second ends of the ports, and is provided with a lever and latch mechanism 5 to open and close the cap 3. The inner surface of the cap, that comes into contact with the second end of the port(s) when closed, is preferably provided with a seal 6. An additional seal, such as an O-ring seal 7, may also be provided around the second end of the port(s). The inner surface of the cap may be formed with respective plugs or protrusions 41, 42 arranged to fit into the port fittings when the cap is closed.

In the example, the latch and lever mechanism includes a lever 15 having a lever body 151, a lever end 152 and a latch end 153. When the cap 3 is in the closed position, the lever body 151 lies across the outer surface of the cap, essentially flat against the cap, with the lever end 152 adjacent the hinge 4. The latch end 153 includes a catch or claw 154 that secures in a recess or detent 155 on the side of the housing opposite the hinge 4. The closed position is shown in FIG. 2A.

Figure 2A:
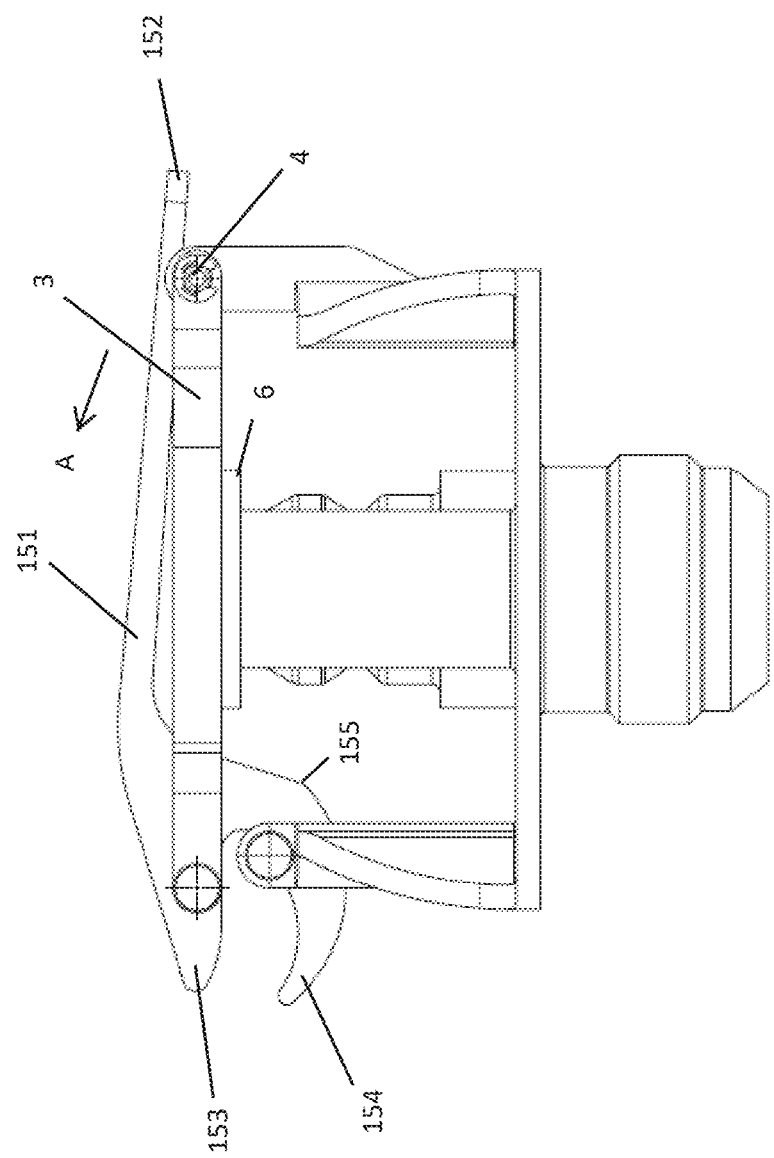
FIGS. 2A and 2B illustrate, respectively, an assembly such as that shown in FIG. 1 in the closed and opened positions.

To open the cap 3, the lever end 152 first needs to be lifted away from the cap, in the direction of arrow A in FIG. 2A to cause the latch end 153 to move the claw 154 out of engagement with the detent 155. The lever 15 is then moved in an arc movement (arrow B in FIG. 2B) about the hinge 4. As the latch end of the lever is attached to the cap 3 (e.g. by a pin 8), the movement of the latch causes corresponding movement of the cap 3 about the hinge 4 to move the cap 3 out of engagement with the second end of the port(s) (FIG. 2B). In an example, not shown, where each port has its own cap, the opening motion would be similar for each cap 3.

To close the cap 3, the lever 15 is then moved in an arc relative to the housing (arrow C in FIG. 2B) opposite to the opening direction B, moving the lever and the cap about the hinge 4 to close over the port and to bring the latch end 154 into engagement with the detent 155. The lever is then brought down (arrow D) towards the outer surface of the cap 3 to the original position, essentially flat against the cap 3 (FIG. 2A) and the latch end locks behind the detent.

Figure 2B:
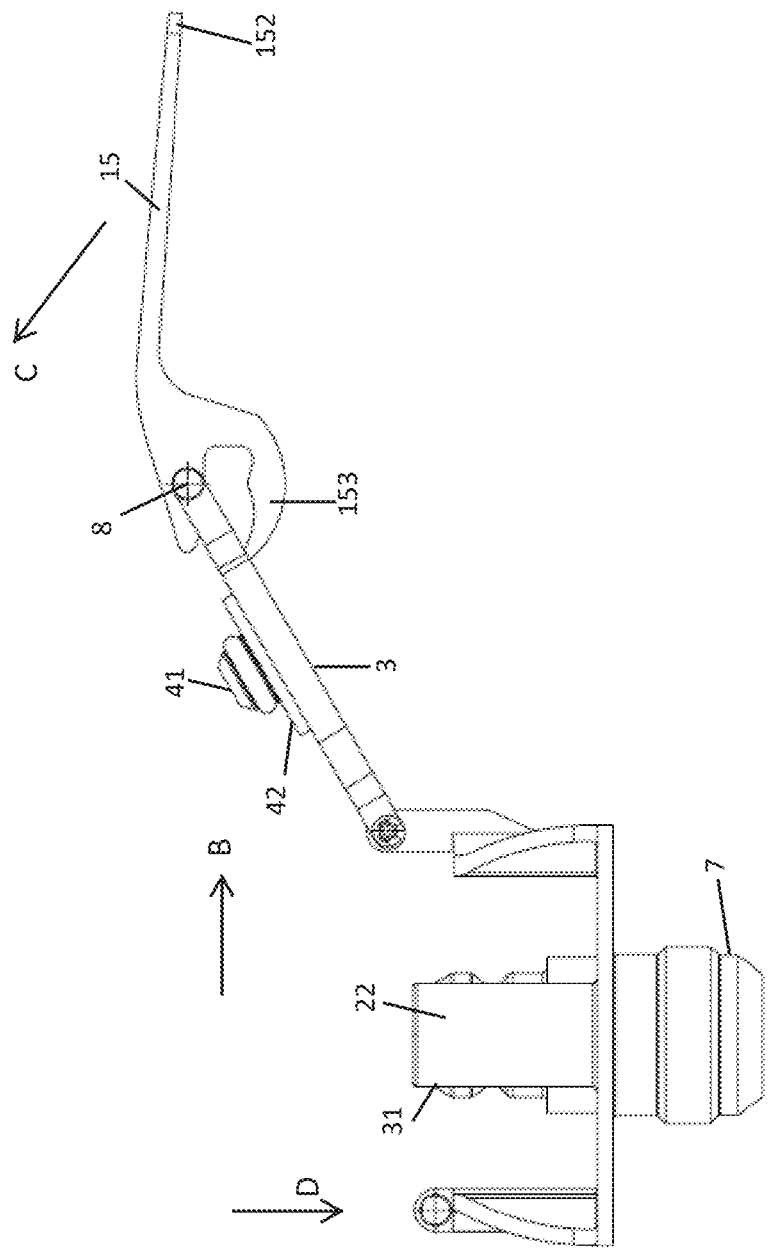
Figure 3A:
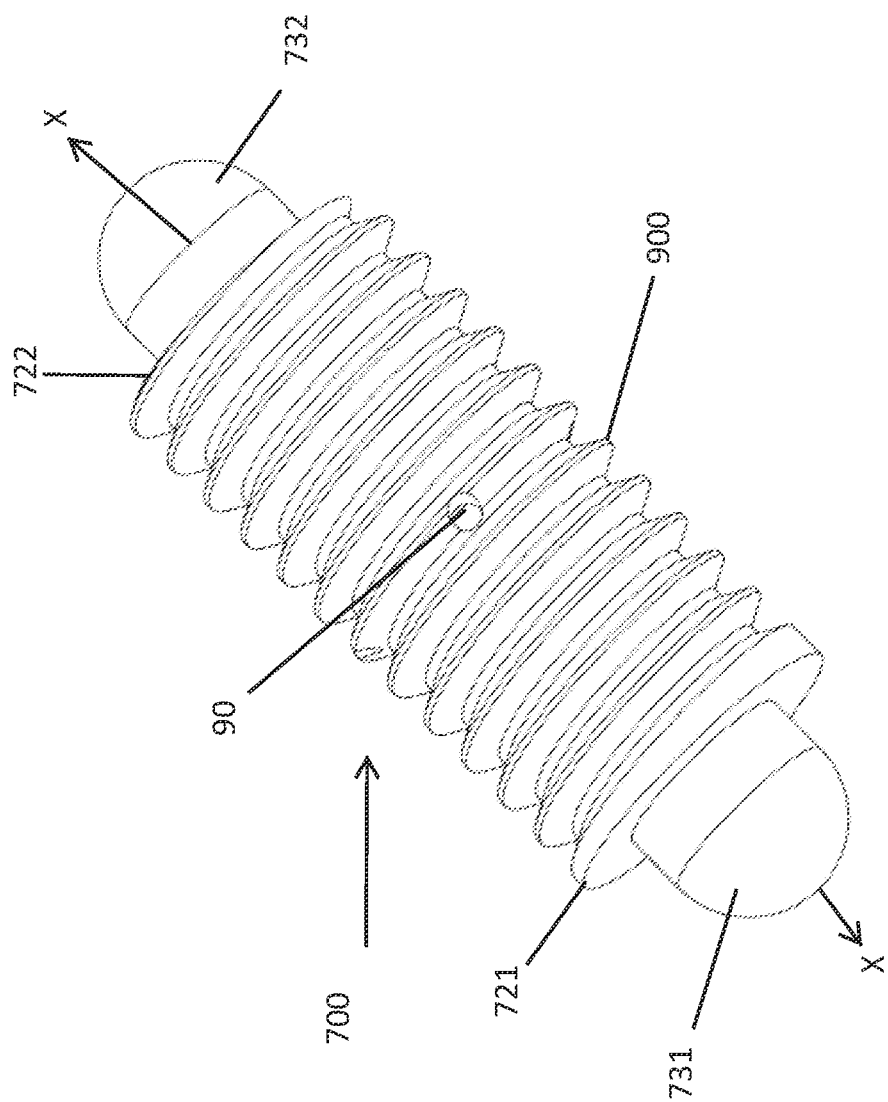
FIG. 3A is a 3D view of an example of a detail of a closure assembly according to this disclosure.
Figure 3B:
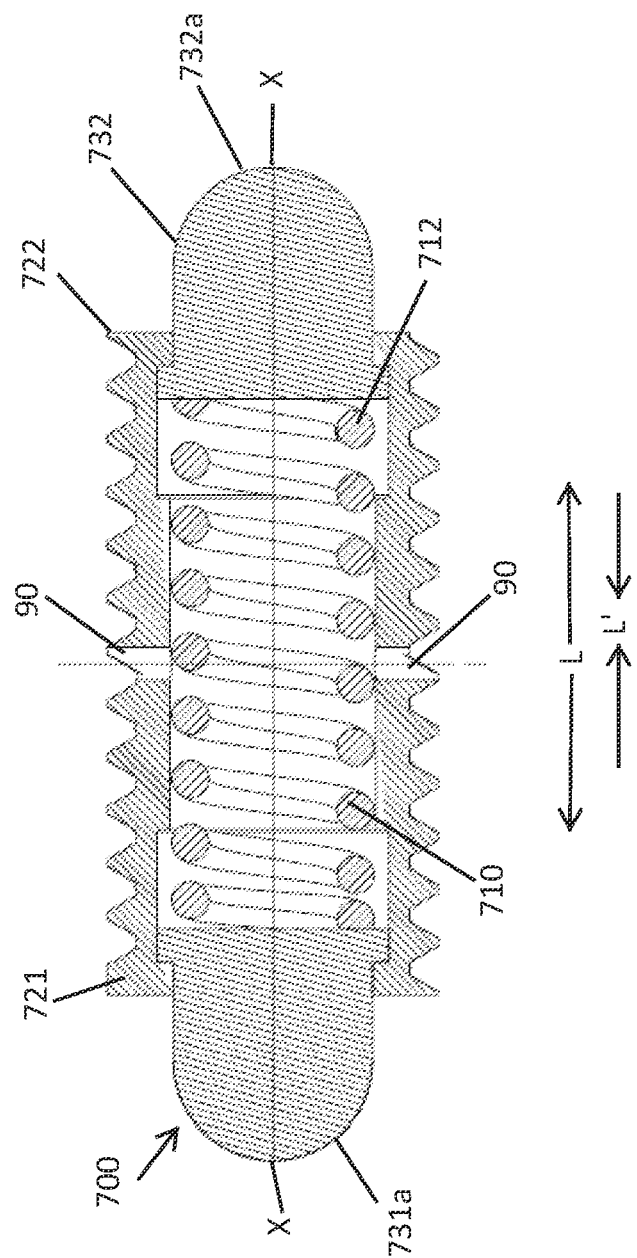
FIG. 3B is a sectional view of the detail of FIG. 3A.

As can be seen from, in particular, FIG. 2B, the arcuate motion of the lever and the cap defines a large range of movement relative to the size of the overall assembly and would require a large area above the ports to allow the cap to be opened and closed.

Further, because the lever and the detent of the catch with which it engages have a tight fit, there is a high frictional force between the parts and the repeated movement of the lever about the hinge also causes wear of the closure parts including the hinge part of the housing. If the engagement between the lever and the detent becomes loose, there is a risk of the cap inadvertently opening. As the detent is formed integrally with the housing, which is a fully machined part, such a housing is expensive and time consuming to manufacture.

The present disclosure provides an improved closure assembly that requires less space to open and close the cap(s), and is smaller and simpler and less expensive to manufacture. An example will be described with reference to FIGS. 3 to 6.

Figure 6B:
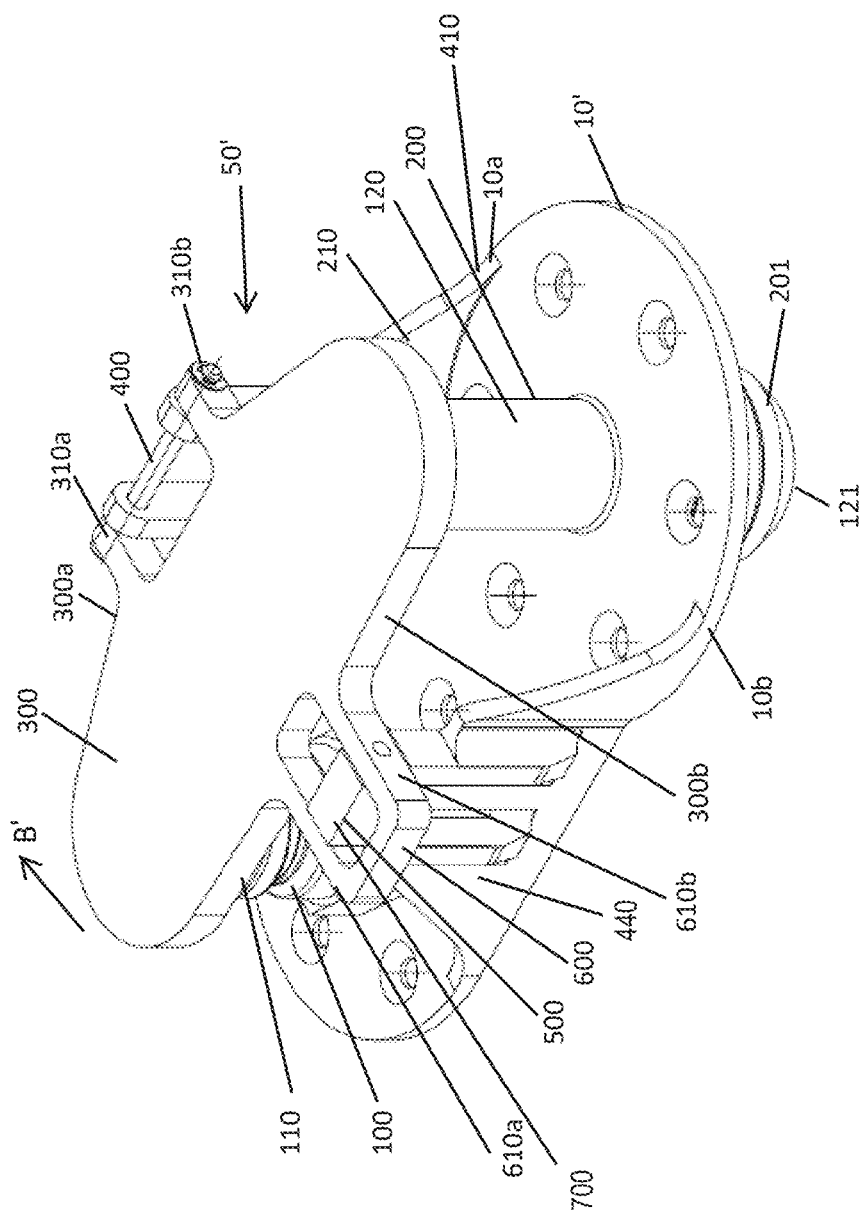

In the same way as shown in FIGS. 1 and 2 (and again in FIG. 6A), the closure assembly 50' of the disclosure, and example of which is shown in FIG. 6B, is provided for a fill port 100 and an overflow port 200 provided in a housing 10'. As in the example described above, the first end 101 of the fill port and the first end 201 of the overflow are configured to fluidly connect to the storage tank. The fittings 110 and 210 at the second ends of the ports are configured to, respectively, fluidly connect to the fill line and the overflow line (not shown) during filling. A flow passage 111, 211 extends from the fittings, through the port, to the first ends. A cap 300 is attached to the housing 10' via a hinge 400, the hinge being provided by an upstanding hinge flange 410 at one side 10a of the housing 10' which forms a hinge 400 with two opposing hinge arms 310a, 310b extending from one side 300a of the cap 300. The height of the hinge flange and the configuration of the hinge is such that the cap lies flat across the ports to close the ports in a closed position in the same way as the cap of a known assembly such as shown in FIG. 6B. A catch assembly 500 is provided to lock the cap 300 in the closed position relative to the housing 10' and the ports. The closure assembly of this disclosure is, however, different to the known assembly described above. Rather than the closure requiring a large radius lever to open and close the fill ports, the closure is formed with a releasable spring catch between the cap and the housing as will be described further below.

The examples shown in the drawings and described below all have two ports and a single cap that covers both ports. This is, however, just one example and the principles of the assembly of the invention can also be applied to an assembly only having a single port and/or having multiple ports each with its one individual cap.

Instead of the lever/latch mechanism, the closure of the present disclosure comprises a spring latch part 700 that is located in a channel 800 formed in a catch flange 440 on the side 10 b of the housing opposite (with respect to the location of the ports extending through the housing 10') the side of the hinge flange 410 of the housing 10'. A catch 600 on the cap 300 at side 300 b opposite the hinge side 300 a of the cap 300, forms a locking engagement with the spring latch part 700 when the cap 300 is closed. The locking engagement is released by a user manually opening the cap 300.

As best seen in FIGS. 3A, 3B, 4A, 4B, 5B, and 6B the spring latch part 700 comprises a spring 710 mounted in a spring latch part body 720 having an axis X between a first end 721 and a second end 722, the spring extending along the axis. The spring latch part also comprises a first ball pin 731 at a first end 711 of the spring 710 and a second ball pin 732 at a second, opposite end 712 of the spring, the spring force being such as to bias the ball pins to extend from the respective first end and second end of the spring latch part body, the ball pins being axially moveable relative to the spring latch part body with extension (direction L) and compression (direction L') of the spring. The ends 731 *a*, 732 *a* of the ball pins extending from the spring latch part body are rounded.

Figure 4A:
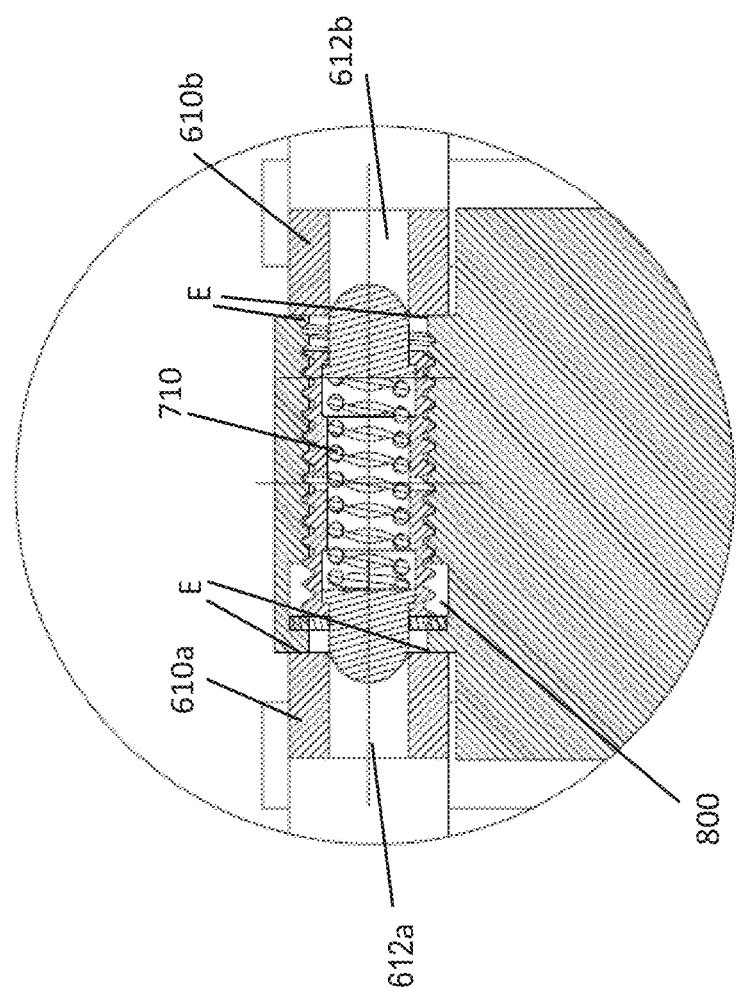
FIG. 4A is a sectional view of a closure according to this invention in the locked position.

The position and height of the catch flange [410] 440 is such that the position of the channel 800 and, accordingly the spring latch part 700 located in the channel aligns with the catch 600 formed on the cap of the fill port. The axial dimension of the channel in the catch flange matches the axial dimension between two opposing arms 610 *a*, 610 *b* of the catch. The arms of the catch are provided with recesses 612 *a*, 612 *b* configured to receive the ball pins 731, 732 extending from the spring latch part body and the channel when the cap is closed and the catch fits over the catch flange of the housing. In the closed position, therefore, the arms of the catch are located either side of the channel in the catch flange with the recesses aligned with the channel, the ball pins are biased by the spring to extend out of the channel beyond the axial ends of the catch flange and to extend into the corresponding recess of the catch of the closed cap to lock the cap in the closed position. This is shown in FIG. 4A.

Figure 4B:
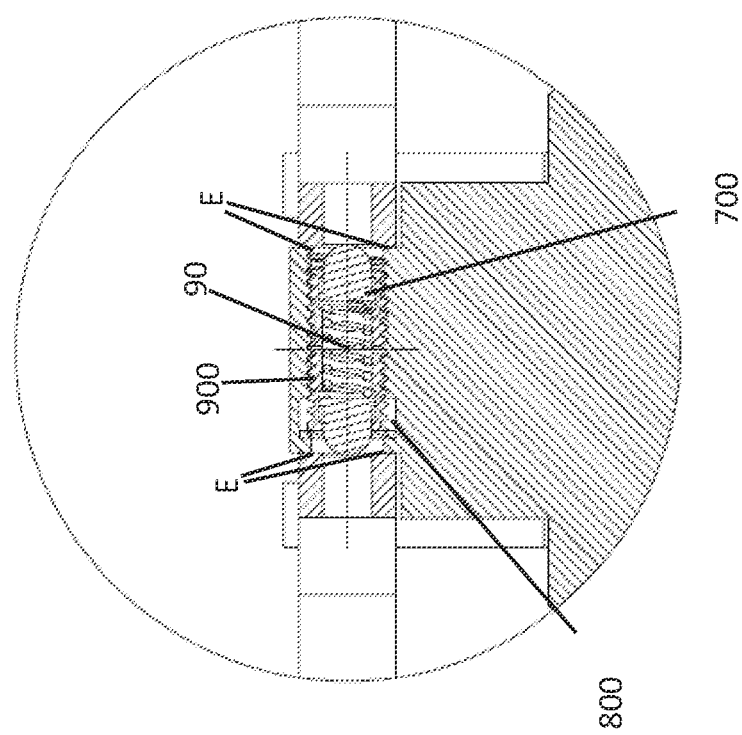
FIG. 4B is a sectional view of a closure as in FIG. 4A in the unlocked position.

To open the cap, the cap is lifted in the opening direction (Direction B') which causes the edges E of the recesses 612*a*, 612*b*, as the latch is lifted with the cap, to press against the ball pins against the biasing force of the spring. This pushes the ball pins axially inwards (direction L') into the channel, compressing the spring. The ball pins no longer engage in the recesses and so the cap is free to open, as shown in FIG. 4B. Once the cap catch has passed the ball pins, the spring relaxes again so that the ball pins extend again out of the channel.

To re-close and lock the cap, the cap is closed (opposite to direction C) causing the edges E of the recesses in the catch arms to ride against and press, against the spring force, the rounded ends of the ball pins. As the recesses align with the ball pins, the ball pins are able, under the force of the spring, to move in direction L into the recesses where they lock until a manual opening force is applied by the user.

The closing force of the assembly is adjusted by the force of the spring 710. This means that different opening forces can be selected depending on the situation in which the assembly is used, e.g. setting a higher opening force to avoid accidental opening in high vibrational environments, but also setting the force low enough to allow a user to manually open the cap.

In the example shown, to better secure the spring latch part in the channel of the flange, the outer surface of the spring latch part body may be provided with surface features e.g. an external thread 900 to engage with corresponding features/threads in the channel. The allows for simple and reliable assembly of the part and means that the part can be easily removed and exchanged in the event of wear or damage.

A particular advantage of the assembly according to this disclosure is that the spring latch part can be manufactured using additive manufacturing (AM) which enables relative complex structures to be made easily, quickly and inexpensively. Holes 90 may be formed in the body, through the thread 900, for removal of an additive powder after finishing the AM process. These same holes 90 can, then, after assembly, be used for injection of lubricant into body. This can prevent dirt and other contaminants getting into the part and can extend the lifetime of the part. The parts can be manufactured, for example, using steel powder. The use of AM reduces assembly and machining time and cost resulting in a less expensive assembly. The risk of failure during assembly is also reduced. As the part has relatively small dimensions, a normal machine manufacture and assembly could result in damage to the part. This is avoided when using AM.

Figure 5A:
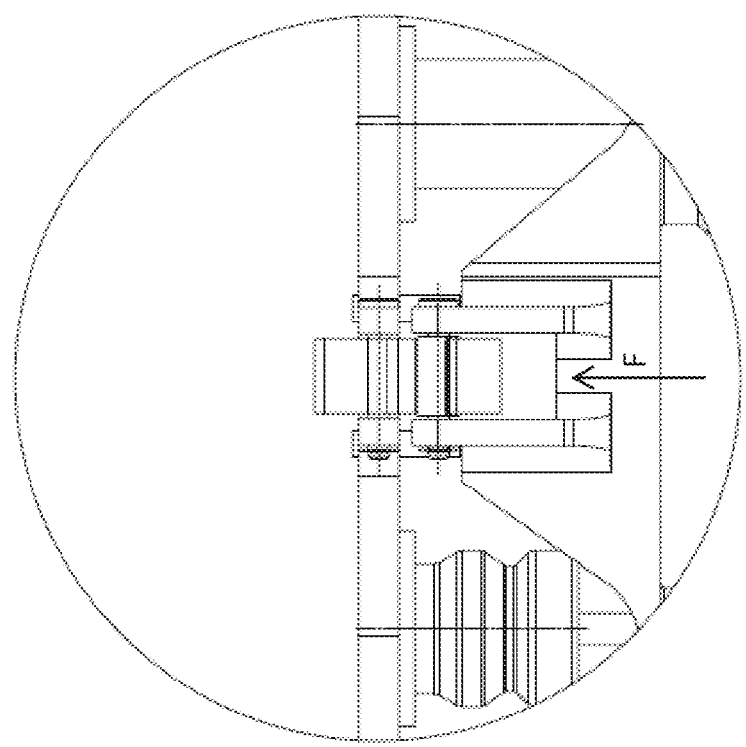
FIG. 5A shows the forces working on the closure of a known assembly.
Figure 5B:
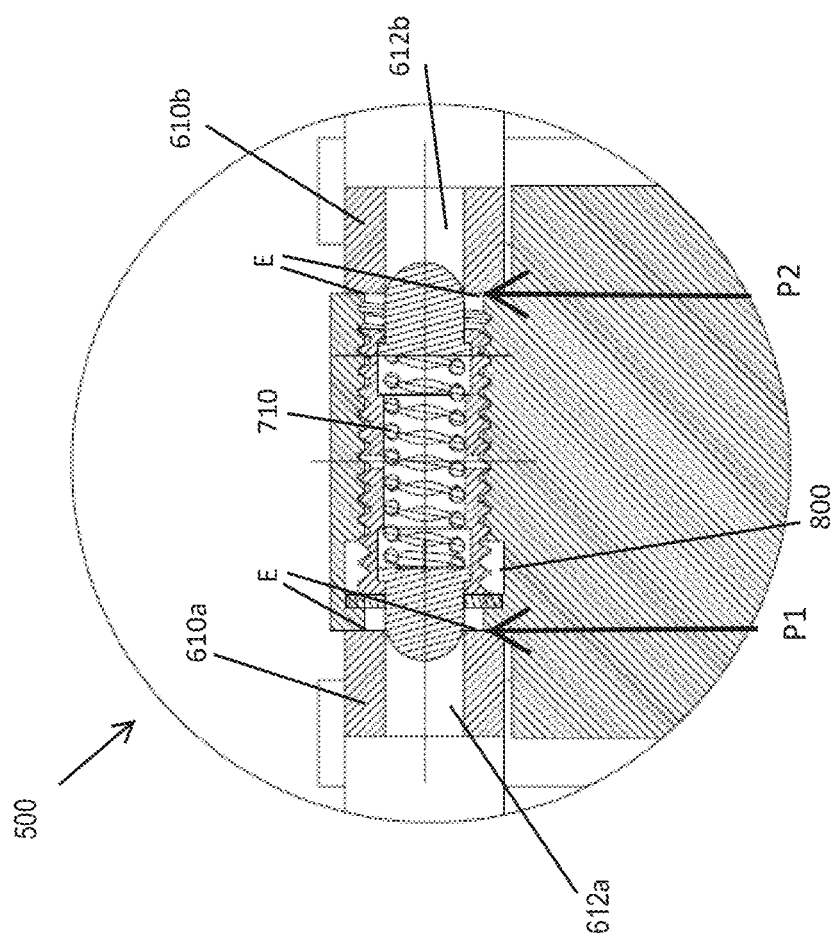
FIG. 5B shows the forces working on the closure according to this disclosure, for comparison.

As can be seen by comparing FIGS. 5A and 5B, in the known latch/lever assembly (FIG. 5A) all of the force F of the catch acts on a single point of the assembly which can lead to wear. In contrast, in the assembly of this disclosure, particularly when made using AM, the force is distributed across two points P1, P2 of contact which results in reduced overall wear.

As mentioned above, the closure assembly can also be used with an assembly having a single port or with an assembly having several ports each with an individual cap and closure assembly. Such embodiments also fall within the scope of the invention as defined by the claims.

What is claimed is:

1. A fill port assembly comprising:
a housing having an opening therethrough;
a fill port located in and extending through the opening defining a flow passage through the fill port from a first end to a second end, the flow passage having an axis defined between the first end and the second end; and
a closure mechanism moveable between an open position in which the flow passage is open and allows fluid flow therethrough and a closed position in which the flow passage is closed and prevents fluid flow therethrough, wherein the closure mechanism comprises:
a cap attached at a first side of the cap to a first side of the housing via a hinge, the cap pivotable about the hinge between an open position with respect to the fill port and a closed position to close the second end of the fill port, and a catch assembly provided between a second side of the cap, opposite the first side, and a second side of the housing, opposite the first side, to releasably secure the cap in the closed position, wherein the catch assembly comprises a spring latch part secured in a channel at the second side of the housing, the spring latch part having first and second end pins and a spring between the first and second end pins, the spring biased to extend the first and second end pins beyond the respective ends of the channel, the catch assembly further comprising opposing first and second catch arms extending from the second side of the cap arranged to cooperate respectively with the first and second end pins of the spring latch part as the cap is pivoted about the hinge to the closed position, the first and second catch arms each having a respective inwardly facing recess in which the respective end pins of the spring latch part are received when the cap is moved to the closed position.

2. The fill port assembly of claim 1, wherein the first and second pins are shaped to correspond to the shape of the recesses of the first and second arms.

3. The fill port assembly of claim 1, wherein the first and second arms are formed with edges either side of the recess, the arms configured such that the distance between the edges of the first arm and the edges of the second arm is less than the length of the spring latch part as defined by the first and second ends when biased by the spring, such that as the cap is moved to the closed position, when the edges move past the ends of the spring latch part, the first and second ends are pushed inwards against the force of the spring and then spring back outwards when the recesses are aligned with the first and second ends.

4. The fill port assembly as claimed in claim 1, wherein the hinge is provided on a first flange extending from the first side of the housing and the catch assembly channel is provided in a second flange extending from the second side of the housing.

5. The fill port assembly of claim 1, wherein the first and second ends of the spring latch part are rounded.

6. The fill port assembly of claim 1, wherein the spring latch part has an outer surface provided with surface features and the channel has an inner surface provided with mating surface features to secure the spring latch part in the channel.

7. The fill port assembly of claim 6, wherein the surface features are threads.

8. The fill port assembly of claim 1, wherein the spring latch part is an additively manufactured part.

9. The fill port assembly of claim 8, wherein holes are provided through the spring latch part for removal of additive powder from the additive manufacture.

10. The fill port assembly of claim 1, wherein the housing has a second opening therethrough through which an overfill port is provided, wherein the cap is configured to close over both the fill port and the overfill port in the closed position.

11. A water system comprising a water tank and the fill port assembly as claimed in claim 1, mounted to the tank via which the tank can be filled from a water supply.

12. The water system as claimed in claim 11, further comprising a water supply and a water line connecting the water supply to the fill port.

13. An aircraft comprising the water system as claimed in claim 11.

* * * * *